(12) United States Patent
Isomura (10) Patent No.: US 10,506,137 B2
(45) Date of Patent: Dec. 10, 2019

(54) IMAGE CODING DEVICE, IMAGE CODING METHOD, AND IMAGE CODING SYSTEM

(71) Applicant: SEIKO EPSON CORPORATION, Tokyo (JP)

(72) Inventor: Masakazu Isomura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/268,551

(22) Filed: Feb. 6, 2019

(65) Prior Publication Data

US 2019/0246011 A1    Aug. 8, 2019

(30) Foreign Application Priority Data

Feb. 8, 2018    (JP) .................................. 2018-020685

(51) Int. Cl.
*H04N 1/64* (2006.01)

(52) U.S. Cl.
CPC ..................... *H04N 1/64* (2013.01)

(58) Field of Classification Search
USPC .................................................. 358/1.9, 539
See application file for complete search history.

(56) References Cited

U.S. PATENT DOCUMENTS

| | | | | |
|---|---|---|---|---|
| 5,602,976 A * | 2/1997 | Cooper | ................... | G06K 15/00 358/1.15 |
| 6,054,943 A * | 4/2000 | Lawrence | ........... | H03M 7/3053 341/67 |
| 6,343,157 B1 | 1/2002 | Yada | | |
| 8,340,442 B1 * | 12/2012 | Rasche | ................... | H04N 19/60 382/232 |
| 8,666,186 B1 * | 3/2014 | Rasche | .................... | G06K 9/36 382/244 |
| 2003/0058348 A1 * | 3/2003 | Hirai | ........................ | H04N 1/40 348/222.1 |
| 2008/0037880 A1 * | 2/2008 | Lai | ....................... | H04N 19/172 382/232 |
| 2008/0198270 A1 * | 8/2008 | Hobbs | .................... | H04N 19/44 348/708 |
| 2009/0245631 A1 | 10/2009 | Isomura | | |
| 2010/0329548 A1 * | 12/2010 | Yoshimura | ......... | H04N 1/00278 382/164 |

(Continued)

FOREIGN PATENT DOCUMENTS

| | | |
|---|---|---|
| JP | 11-252563 A | 9/1999 |
| JP | 2001-257888 A | 9/2001 |

(Continued)

*Primary Examiner* — Anh-Vinh T Nguyen
(74) *Attorney, Agent, or Firm* — Global IP Counselors, LLP (57) ABSTRACT

An image coding device for coding block data each including a plurality of pixels by selecting, for each block data, one of a lossy mode and a lossless mode in which coding includes use of a dictionary with different colors each registered in a corresponding one of p (p is a natural number) dictionary indexes, the image coding device including: an irreversible coding unit configured to perform coding in the lossy mode in a case where the number of unregistered colors is greater than a reference value, q (q is a number identical to the p) colors most recently coded in the lossless mode in a case where the number of unregistered colors is less than or equal to the reference value.

11 Claims, 10 Drawing Sheets

(56) References Cited

U.S. PATENT DOCUMENTS

2017/0359471 A1* 12/2017 Kadoi .................. G06T 7/20
2018/0054630 A1* 2/2018 Chang ................. H04N 19/91

FOREIGN PATENT DOCUMENTS

| JP | 2009-239779 A | 10/2009 |
|---|---|---|
| JP | 4418736 B2 | 2/2010 |
| JP | 4725321 B2 | 7/2011 |

* cited by examiner

| DICTIONARY INDEX | VARIABLE-LENGTH CODE | CODE BIT LENGTH |
|---|---|---|
| 0 | 1 | 1 |
| 1 | 01 | 2 |
| 2 | 001 | 3 |
| 3 | 0000 | 4 |
| - | 0001 | 4 |

| FREQUENCY COMPONENT \ QUALITY | q0 | q1 | q2 |
|---|---|---|---|
| LL3 | $2^0$ | $2^0$ | $2^0$ |
| HL3,LH3,HH3 | $2^1$ | $2^1$ | $2^1$ |
| HL2,LH2,HH2 | $2^3$ | $2^2$ | $2^2$ |
| HL1,LH1,HH1 | $2^5$ | $2^4$ | $2^3$ |

IMAGE CODING DEVICE, IMAGE CODING METHOD, AND IMAGE CODING SYSTEM

BACKGROUND

1. Technical Field

The disclosure relates to image coding.

2. Related Art

JP-A-11-252563 discloses a multimode coding system dividing a to-be-printed image into block data each including 8×8 pixels and selecting one of a lossless mode and a lossy mode for each block data. Coded data are decoded, and the decoded data are used as print data.

SUMMARY

Coding in the lossless mode in the related art described above is a technique in which results of coding of one block data are prevented from affecting coding of another block data. Thus, even in a case where, e.g., consecutive block data each include pixels in similar colors, improving a compression rate for coding utilizing such consecutiveness is difficult. An advantage of the disclosure is to increase the compression rate in a case where the lossless mode is selected.

An aspect of the disclosure provides an image coding device configured to code block data each including a plurality of pixels by selecting, for each block data, one of a lossy mode and a lossless mode in which coding includes use of a dictionary with different colors each registered in a corresponding one of p (p is a natural number) dictionary indexes, the image coding device including an irreversible coding unit configured to perform coding in the lossy mode in a case where the number of unregistered colors is greater than a reference value, the number of unregistered colors being a number of colors included in block data of interest and not registered in the dictionary before coding of the block data of interest is started, the block data of interest being included in the block data to be coded by the image coding device and being of interest for coding, and a dictionary coding unit configured to perform coding in the lossless mode and register, in the dictionary, q (q is a number identical to the p) types of colors most recently coded in the lossless mode in a case where the number of unregistered colors is less than or equal to the reference value.

According to this aspect, the most recently coded colors are registered in the dictionary. Thus, when the lossless mode is used for coding in a case where consecutive block data each include pixels in similar colors, a rate of dictionary coding increases to improve the compression rate.

In the above-described aspect, the image coding device may further include an image characteristic determination unit configured to output a signal indicating whether the number of unregistered colors is less than or equal to the reference value. According to this aspect, the signal allows determination of whether the lossless mode or the lossy mode has been used for coding. Thus, when a code is decoded, which mode is to be used for the decoding may be determined.

In the above-described aspect, the p is 2 or greater, and the dictionary coding unit may register the most recently coded color in a first index, output a code with a first data amount in a case where the color registered in the first index is to be coded, and output a code with a second data amount greater than the first data amount in a case where a color registered in a second index is to be coded. According to this aspect, the compression rate is improved in a case where pixels in the same color are consecutively coded. The data amount of a code is also referred to as the "length of the code" or the "code length".

In the above-described aspect, in a case of coding an unregistered color not registered in the dictionary, the dictionary coding unit may reversibly code the unregistered color to output a resultant code. According to this aspect, even in a case not all the colors are registered in the dictionary, the lossless mode can be used for coding.

In the above-described aspect, the irreversible coding unit may use a Haar wavelet transformation for coding. According to this aspect, irreversible coding may be achieved at a high compression rate.

In the above-described aspect, the image coding unit may further include a change unit configured to change the reference value in accordance with the number of unregistered colors after the dictionary coding unit performs coding. According to this aspect, the reference value is changed in accordance with the number of unregistered colors. Thus, even in a case where block data with the same color arrangement are coded, the lossless mode may be selected in some cases, and the lossy mode may be selected in other cases. This allows suppression of a decrease in compression rate resulting from concentrated use of the lossless mode and degradation of code quality resulting from concentrated use of the lossy mode.

In the above-described aspect, the change unit may reduce the reference value in a case where the number of unregistered colors is greater than a prescribed number, and increase the reference value in a case where the number of unregistered colors is less than or equal to the prescribed number. According to this aspect, reversible coding is used for images such as line drawings and texts which include a small number of colors and for which irreversible coding is likely to result in noticeable degradation, and irreversible coding is used for images such as natural images which include a large number of colors and for which reversible coding results in a reduced compression rate. This makes the lossless mode and the lossy mode well-balanced. The compression rate based on dictionary coding decreases as the number of unregistered colors increases. Thus, the reference value is preferably changed such that the likelihood that irreversible coding is selected for the next block data increases consistently with the number of unregistered colors. Thus, in this aspect, the reference value is reduced in a case where the number of unregistered colors is greater than the prescribed number. On the other hand, in a case where the number of unregistered colors is less than or equal to the prescribed number, coding may have been achieved with a high compression rate and high image quality, and thus, dictionary coding preferably continues to be performed. Thus, in this aspect, the reference value is increased in a case where the number of unregistered colors is less than or equal to the prescribed number.

In the above-described aspect, even in the case where the number of unregistered colors is less than or equal to the prescribed number, the change unit may maintain the reference value when the reference value is a predetermined upper limit value. According to this aspect, the reference value may be prevented from being excessively increased. This in turn allows prevention of a decrease in the compression rate based on the lossless mode.

In the above-described aspect, the change unit may subtract the number of unregistered colors from the reference value in a current state to reduce the number of unregistered colors. Coding of block data with many unregistered colors in the lossless mode results in a reduced compression rate. Thus, after block data with many unregistered colors are coded in the lossless mode, coding in the lossy mode is preferably performed. According to this aspect, the decrease in reference value increases consistently with the number of unregistered colors. Thus, after block data with many unregistered colors are coded in the lossless mode, the coding in the lossy mode is likely to be performed. This enables the above-described preferable selection of the coding mode.

The disclosure may be implemented in various aspects other than the aspects described above. For example, the disclosure may be implemented in aspects such as an image coding method, a program for implementing the method, and a non-transitory executable recording medium storing the program. The disclosure may also be implemented as an image coding system including an image coding device and an image decoding device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
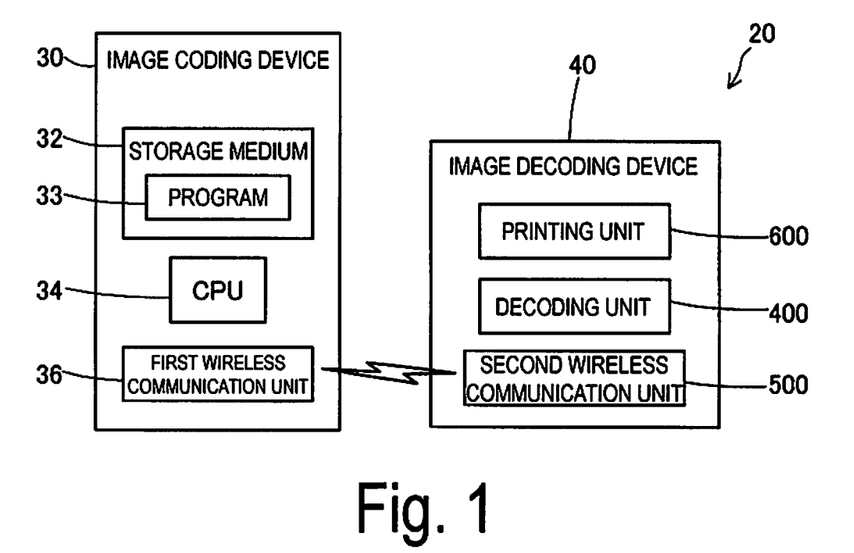
FIG. 1 is a block diagram illustrating a coding system.

FIG. 1 is a block diagram illustrating an image coding system 20. The image coding system 20 includes an image coding device 30 and an image decoding device 40.

The image coding device 30 is a computer. The image coding device 30 includes a recording medium 32, a CPU 34, and a first wireless communication unit 36. The recording medium 32 includes a RAM and a ROM. The recording medium 32 stores a program 33. The program 33 is a program for performing image coding processing described below and the like.

The image decoding device 40 is a printer. The image decoding device 40 includes a decoding unit 400, a second wireless communication unit 500, and a printing unit 600. The second wireless communication unit 500 communicates wirelessly with the first wireless communication unit 36 included in the image coding device 30.

In Exemplary Embodiment 1, images are monochromatic, and a gradation number corresponds to 8 bits/pixel. Thus, pixel data are expressed by luminance values. However, in Exemplary Embodiment 1, luminance values are also represented as "colors". Other exemplary embodiments may be applied to 24 bits/pixel for RGB images or to 32 bits/pixel for YMCK.

Figure 2:
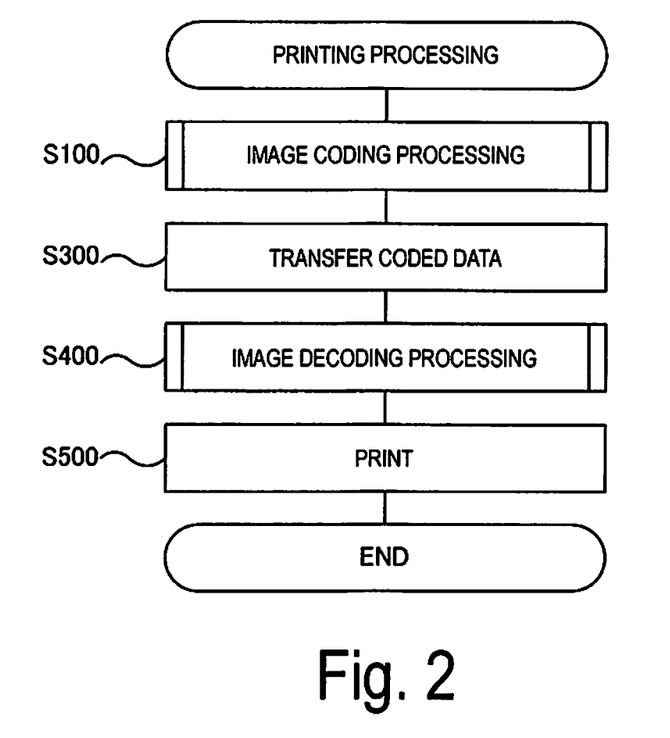
FIG. 2 is a flowchart illustrating printing processing.

FIG. 2 is a flowchart illustrating printing processing. First, the image coding device 30 performs image coding processing (S100). The image coding device 30 then transfers coded data to the image decoding device 40 (S300). Wireless communication between the first wireless communication unit 36 and the second wireless communication unit 500 is used in S300.

Then, the image decoding device 40 performs image decoding processing (S400). Finally, the image decoding device 40 uses the printing unit 600 to print a decoded image (S500).

Figure 3:
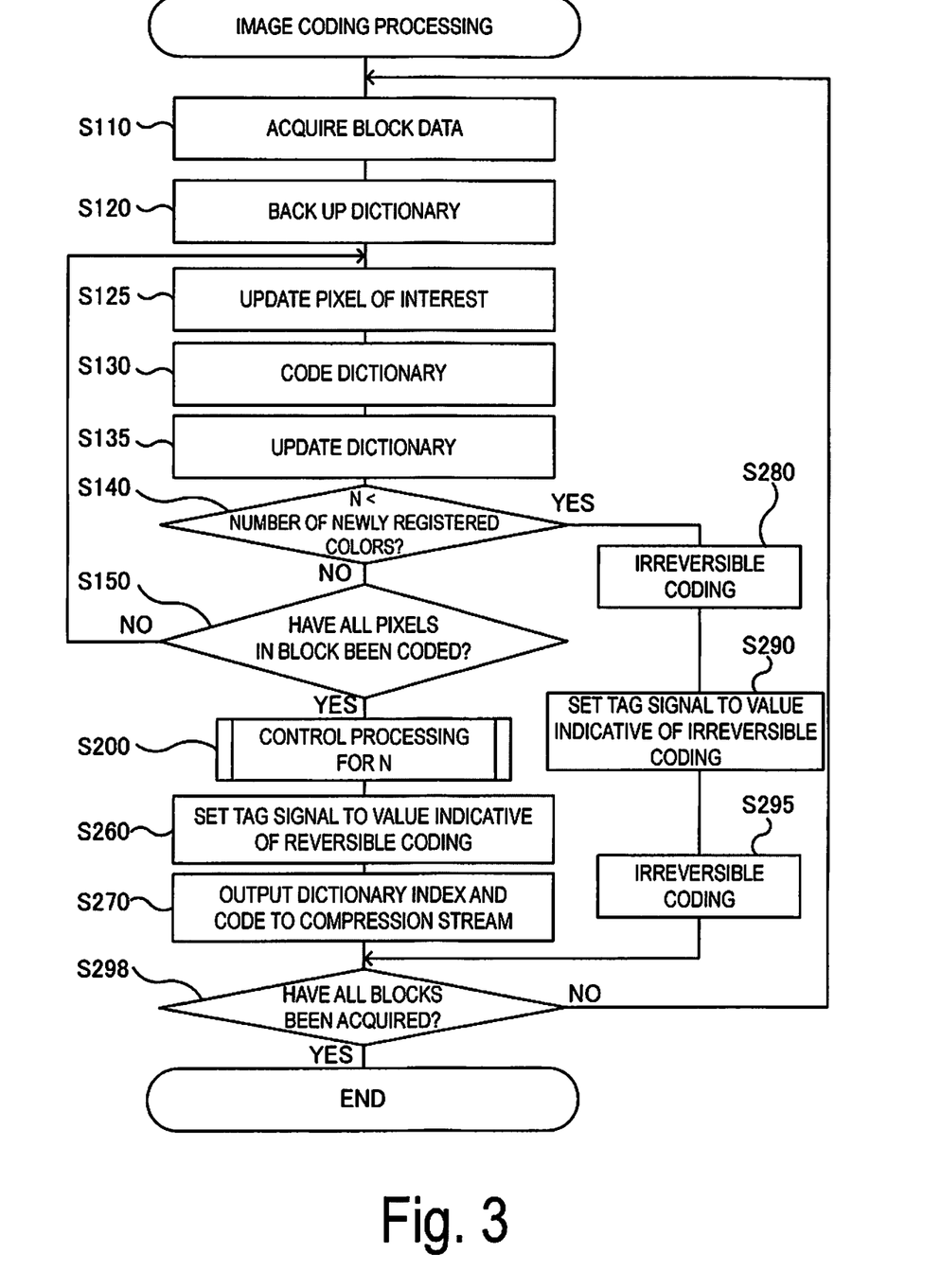
FIG. 3 is a flowchart illustrating image coding processing.

FIG. 3 is a flowchart illustrating the image coding processing in S100. First, the CPU 34 acquires block data (S110). A block refers to a group of 8×8 pixels according to Exemplary Embodiment 1. The block data refer to luminance values of pixels included in the block.

Note that, in a case where, in the entire image, the number of pixels in a vertical direction or a horizontal direction is not a multiple of 8, a block with less than 8×8 pixels is present at an end of the image. In this case, in S110, dummy pixels are added to the block such that the block includes 8×8 pixels, and the resultant 8×8 block of image data is output. In other exemplary embodiments, the block may include 16×16 pixels, 4×4 pixels, or any other number of pixels.

Then, the CPU 34 uses the recording medium 32 to back up a dictionary (described below) (S120). The dictionary is backed up so as to be restored to a state before update even after the dictionary is updated, as described below.

The CPU 34 then updates a pixel of interest (S125). The pixels of interest are pixels that are included in the pixels forming the block and that are of interest for coding. In S125, the CPU 34 selects the pixel of interest one by one from the 64 pixels included in the block.

Figure 4:
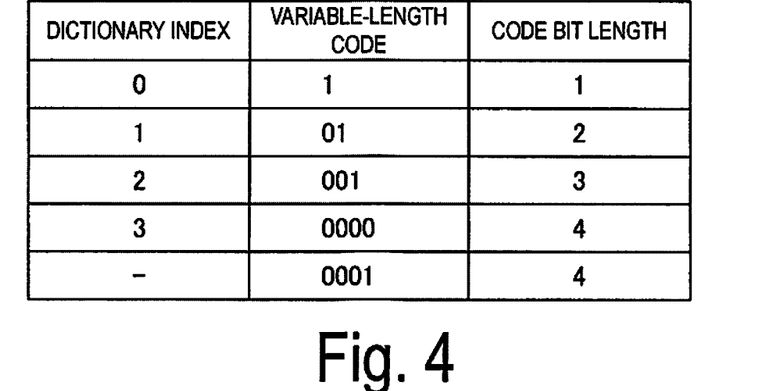
FIG. 4 is a table illustrating a relationship between a dictionary index and a variable-length code and a code bit length.

The CPU 34 then performs dictionary coding (S130). FIG. 4 is a table illustrating a relationship between a dictionary index and a variable-length code and a code bit length. Exemplary Embodiment 1 uses four dictionary indexes: 0 to 3 for simplification of description. However, the number of dictionary indexes is not limited to this and may be any natural number.

In S130, in a case where the color of the pixel of interest is registered in dictionary index 0, the CPU 34 outputs a variable-length code of 1. In this case, the code bit length is 1. In other words, the data amount of the code is 1 bit.

In S130, in a case where the color of the pixel of interest is registered in dictionary index 1, the CPU 34 outputs a variable-length code of 01. In this case, the code bit length is 2. In other words, the data amount of the code is 2 bits.

In S130, in a case where the color of the pixel of interest is registered in dictionary index 2, the CPU 34 outputs a variable-length code of 001. In this case, the code bit length is 3. In other words, the data amount of the code is 3 bits.

In S130, in a case where the color of the pixel of interest is registered in dictionary index 3, the CPU 34 outputs a variable-length code of 0000. In this case, the code bit length is 4. In other words, the data amount of the code is 4 bits.

In S130, in a case where the color of the pixel of interest is not registered in the dictionary, the CPU 34 outputs a variable-length code of 0001. In this case, the code bit length is 4. In other words, the data amount of the code is 4 bits. In a case of outputting the variable-length code of 0001, the CPU 34 outputs uncompressed data indicative of a color (in other words, reversible coded data), subsequently to the variable-length code. The uncompressed data in Exemplary Embodiment 1 are each 8-bit data indicative of a luminance value.

Figure 5:
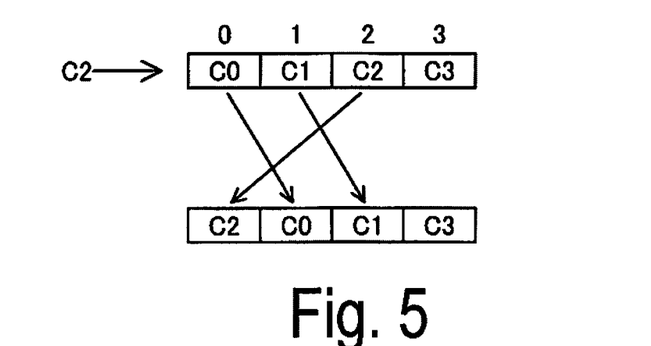
FIG. 5 is a diagram illustrating an example of update of a dictionary.
Figure 6:
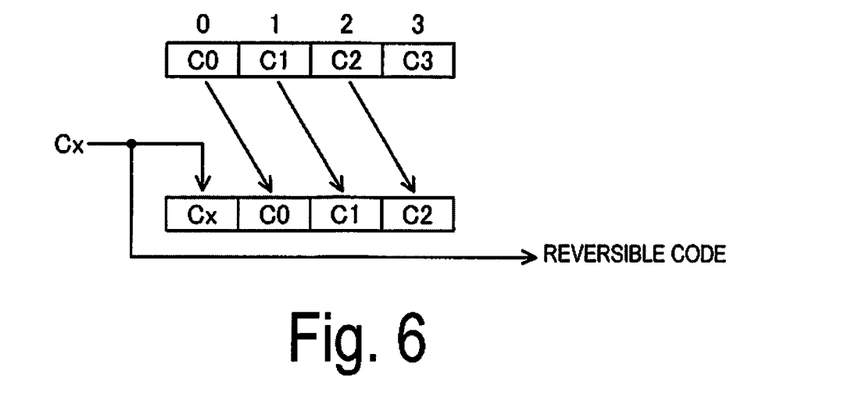
FIG. 6 is a diagram illustrating an example of update of the dictionary.

The CPU 34 then updates the dictionary (S135). FIG. 5 and FIG. 6 illustrate examples of update of the dictionary. In the example illustrated in FIG. 5, a color C0 is registered in dictionary index 0, a color C1 is registered in dictionary index 1, a color C2 is registered in dictionary index 2, and a color C3 is registered in dictionary index 3.

In the example, in a case where the pixel of interest is the color C2, the color C2 is registered in leading dictionary index 0. Moreover, the dictionary indexes higher than the dictionary index in which the color of the pixel of interest is registered are shifted one by one in the lower direction. In other words, the color C0 is registered in dictionary index 1, and the color C1 is registered in dictionary index 2. The dictionary index lower than the dictionary index in which the color of the pixel of interest is registered is not changed. In other words, in the case illustrated in FIG. 5, dictionary index 3 is not changed.

FIG. 6 illustrates update of the dictionary in a case where the color of the pixel of interest is not registered in the dictionary. As illustrated in FIG. 6, the colors registered in the dictionary before update are the same as the colors in FIG. 5. Thus, in a case where the pixel of interest is a color Cx, the color of the pixel of interest is not registered in the dictionary.

In a case where the pixel of interest is the color Cx, which is not registered in the dictionary, the color Cx is newly registered in the leading dictionary index 0. Moreover, the dictionary indexes 0, 1, and 2 are shifted one by one to the lower direction. In other words, the color C0 is registered in dictionary index 1, the color C1 is registered in dictionary index 2, and the color C2 is registered in dictionary index 3. The color C3 registered in the lowest dictionary index 3 is deleted.

The dictionary is updated as described above, and thus, the colors registered in the dictionary are four of the colors previously registered in the dictionary, the four colors having most recently been registered in the dictionary. Furthermore, since the dictionary is updated as described above, the dictionary is not updated in a case where the color registered in dictionary index 0 is to be coded.

Note that the most recently coded color is moved to the leading dictionary index 0 as described above because the code bit length associated with dictionary index 0 is shortest. In other exemplary embodiments, in a case where the shortest code bit length is associated with a dictionary index other than the leading dictionary index (e.g., dictionary index 1), the most recently coded color may be registered in that dictionary index.

The CPU 34 then determines, in coding of one block data, whether the number of colors newly registered in the dictionary (hereinafter referred to as the number of newly registered colors) is greater than a reference value N as described with reference to FIG. 6 (S140). The reference value N is an integer determined by control processing for the reference value N described below (S200).

In a case where the number of newly registered colors is less than or equal to the reference value N (S140, NO), the CPU 34 determines whether all the pixels in the block have been coded (S150). In a case where any pixel is not coded (S150, NO), the CPU 34 returns to S125. When S125 to S150 are repeated as described above, a YES determination is made in one of S140 and S150.

In a case where all the pixels in the block are coded while the condition that the number of newly registered colors is less than or equal to the reference value N is met (S150, YES), the CPU 34 performs the control processing for the reference value N (S200). The control processing for the reference value N will be described with reference to FIG. 7. Note that, in a case where the CPU 34 makes a determination of YES in S150, when the number of newly registered colors is M ($\leq$N), this means that the number of colors not registered in the dictionary (hereinafter referred to as the number of unregistered colors) is M at the time of acquisition of the block data.

When finishing the control processing for the reference value N, the CPU 34 determines a tag signal to be a value indicative of dictionary coding. Specifically, the dictionary coding involves determining the tag signal to be 1. The CPU 34 subsequently outputs, to a compressed stream, a code serving as the tag signal and the code created in S130. The tag signal is added at the head of coding of one block data.

The CPU 34 then determines whether all the block data included in the image data to be printed have been acquired (S298). In a case where not all the block data have been acquired (in other words, not all the block data have been coded) (S298, NO), the CPU 34 returns to S110.

Figure 7:
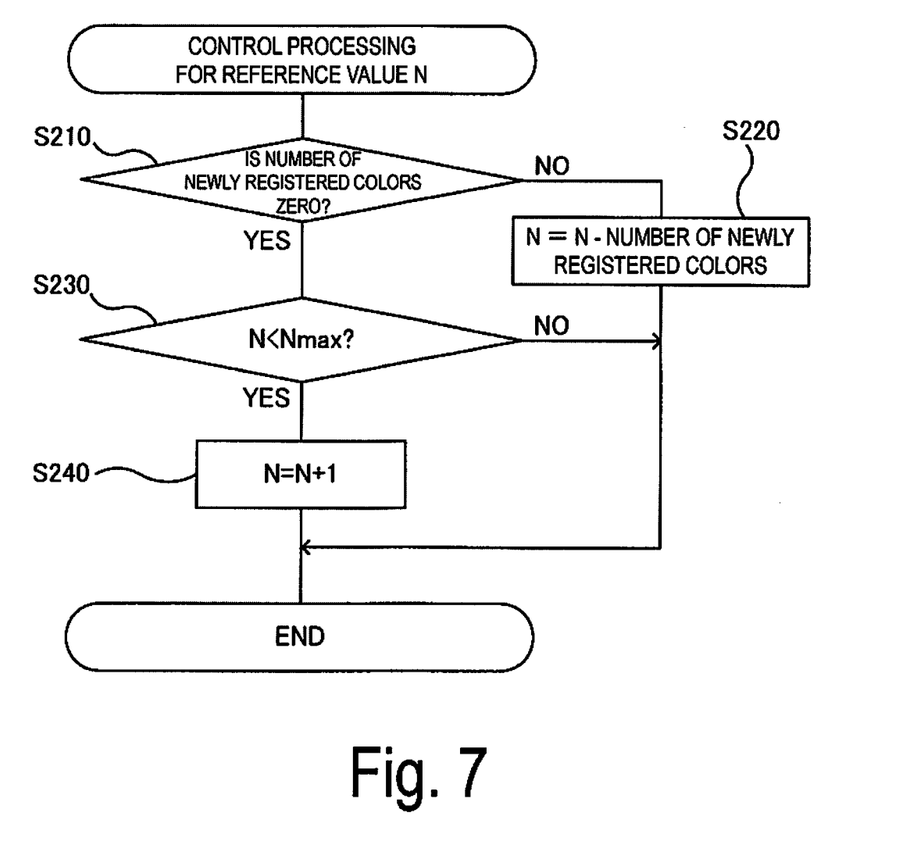
FIG. 7 is a flowchart illustrating control processing for a reference value N.

Now, the control processing for the reference value N will be described with reference to FIG. 7. The CPU 34 first determines whether dictionary coding of one block data has resulted in the number of newly registered colors of zero (S210). Note that the determination in S210 in other exemplary embodiments may be based on whether the number of newly registered colors is less than or equal to a prescribed number. In Exemplary Embodiment 1, the prescribed number is zero.

In a case where the number of newly registered colors is greater than or equal to 1 (S210, NO), the CPU 34 adopts the current reference value N minus the number of newly registered colors as a new value of the reference value N (S220) to terminate the control processing for the reference value N.

On the other hand, in a case where the number of newly registered colors is zero (S210, YES), the CPU 34 determines whether the current reference value N is smaller than Nmax (S230). Nmax represents an upper limit value for a predetermined reference value N.

In a case where the current reference value N is equal to Nmax (S230, NO), the CPU 34 maintains the value of the reference value N to terminate the control processing for the reference value N. On the other hand, in a case where the current reference value N is less than Nmax (S230, YES), the CPU 34 adopts the current reference value N plus 1 as a new value of the reference value N (S240) to terminate the control processing for the reference value N.

On the other hand, as illustrated in FIG. 3, in a case where the number of newly registered colors is greater than the reference value N before all the pixels in the block are coded (S140, YES), the CPU 34 utilizes the back-up in S120 to restore the dictionary (S280). Note that, in a case where the CPU 34 makes a determination of YES in S140, this means that the number of unregistered colors is greater than N at the time of acquisition of the block data.

The CPU 34 then sets the tag signal to a value indicative of irreversible coding (S290). Specifically, the CPU 34 determines the tag signal to be 0. Note that, in other exemplary embodiments, the value indicative of irreversible coding may be 1 and the value indicative of dictionary coding may be 0. The CPU 34 subsequently performs irreversible coding (S295) and then proceeds to S298.

Figure 8:
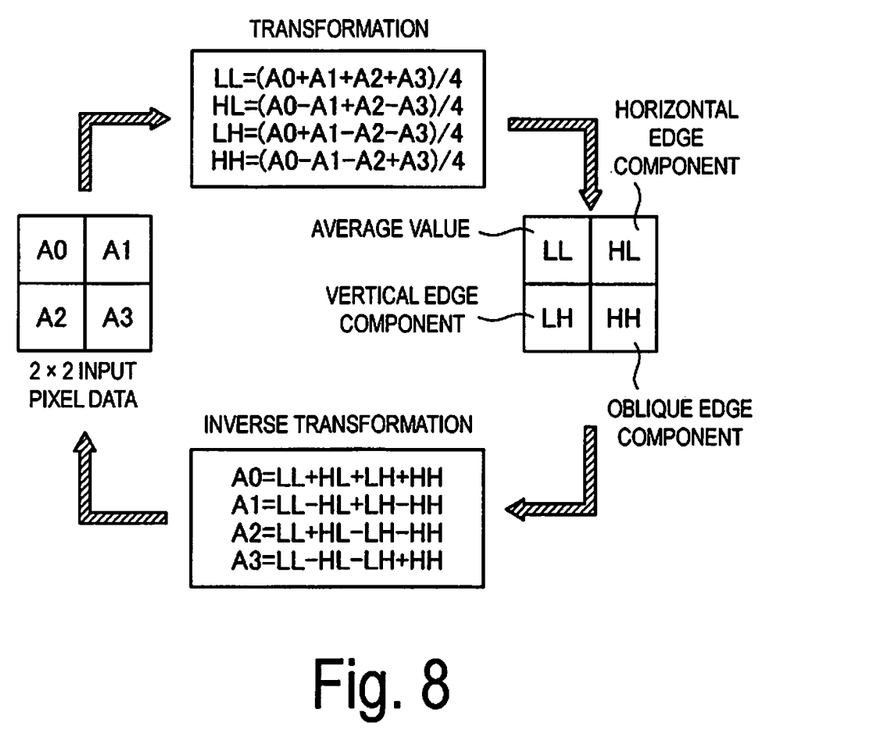
FIG. 8 is a diagram illustrating calculations for a Haar wavelet transformation and inverse transformation.

In Exemplary Embodiment 1, a Haar wavelet transformation is adopted as irreversible coding. FIG. 8 illustrates calculations for the Haar wavelet transformation and inverse transformation. In Exemplary Embodiment 1, the block includes 8×8 pixels, and thus, each input pixel data includes 8×8 pixels. However, for simplification of description, FIG. 8 illustrates a case where each input pixel data includes 2×2 pixels. Calculations include only an addition, a subtraction, and a shift operation. Four pixels A0 to A3 as input pixel data are transformed into four components of the pixels: a DC component (LL), a horizontal edge component (HL), a vertical edge component (LH), and an oblique edge component (HH).

Figure 9:
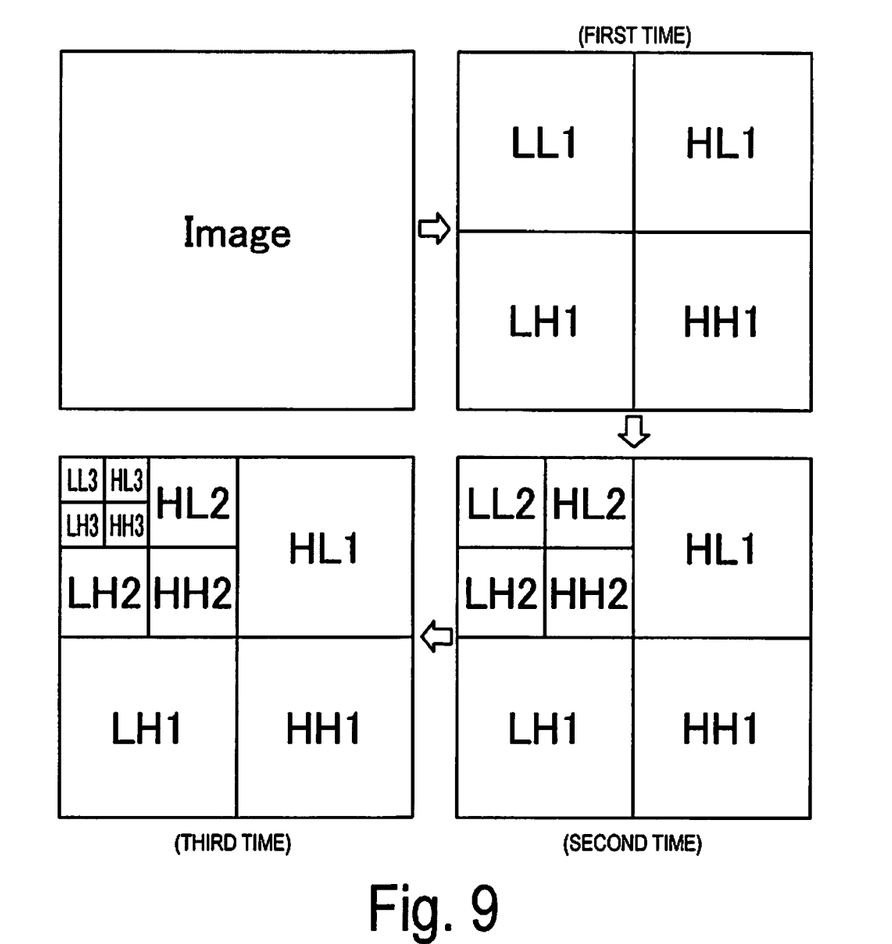
FIG. 9 is a diagram illustrating how a Haar wavelet transformation is performed.

FIG. 9 is a diagram illustrating how the Haar wavelet transformation is actually performed according to Exemplary Embodiment 1. As illustrated in FIG. 9, the CPU 34 performs three hierarchical transformations on the DC component (LL). This causes the input pixel data to be divided into 10 sub-bands. Note that, in other exemplary embodiments, in a case where the block includes 4×4 pixels, the input pixel data may be divided into seven sub-bands by two transformations.

Note that a decrease in entropy as the amount of information after the transformation is generally biased in a natural image such as a photograph. Specifically, the entropy of LL3 has been determined to decrease by a small amount, whereas the entropy of a high frequency component (e.g., HH1) has been determined to decrease by approximately 2 to 4 bits.

The CPU 34 quantizes each of the components transformed as described above. The quantization basically includes divisions. However, Exemplary Embodiment 1 also assumes an aspect in which the quantization is implemented in hardware, and thus, the values that may be used for shift operations including no division are adopted. Specifically, for an input value x, a quantized value Q(x) is calculated using the following equation. A function int is an operator truncating the number after a decimal point and taking only an integral portion.

$$Q(x)=int\{(x+QS/2)/QS\}$$

Figure 10:
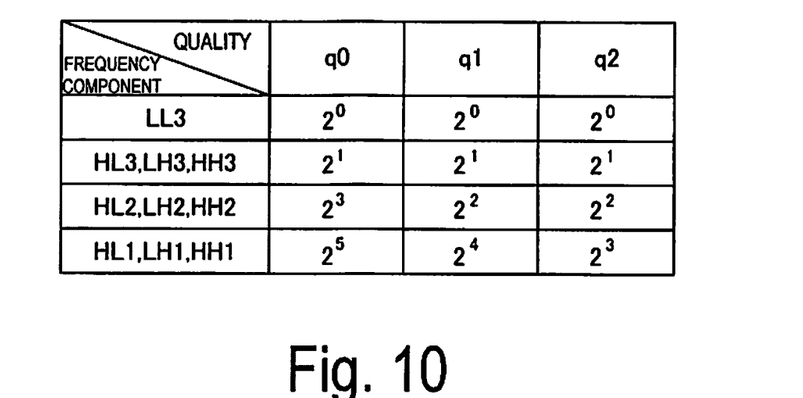
FIG. 10 is a table illustrating an example of a quantized shift value.

Even with an increased compression rate, difficulty in visual perception increases consistently with the level of the frequency component. Thus, in Exemplary Embodiment 1, a larger quantized shift value QS is adopted for a higher frequency component. FIG. 10 illustrates a specific example of the QS value. FIG. 10 illustrates an example in which three types of tables q0, q1, and q2 are provided. Compared to q0, q1 involves small QS values associated with HL2, LH2 and HH2 and HL1, LH1, and HH1, thus providing high image quality. Similarly, compared to q1, q2 involves small QS values associated with HL1, LH1, and HH1, thus providing high image quality. For example, the use of q0 tends to significantly reduce the average entropy of the block data as a whole, in some cases, to approximately ⅙.

The CPU 34 transforms each of the quantized components into a variable-length code corresponding to an occurrence probability of the component to output the resultant variable-length code. The CPU 34 adds, to the head of the variable-length codes, the tag signal set in S290.

As described above, the CPU 34 codes each block data by one of dictionary coding and irreversible coding. When all the block data are coded (S298, YES), the coded data are completed, and the CPU 34 terminates the image coding processing.

Figure 11:
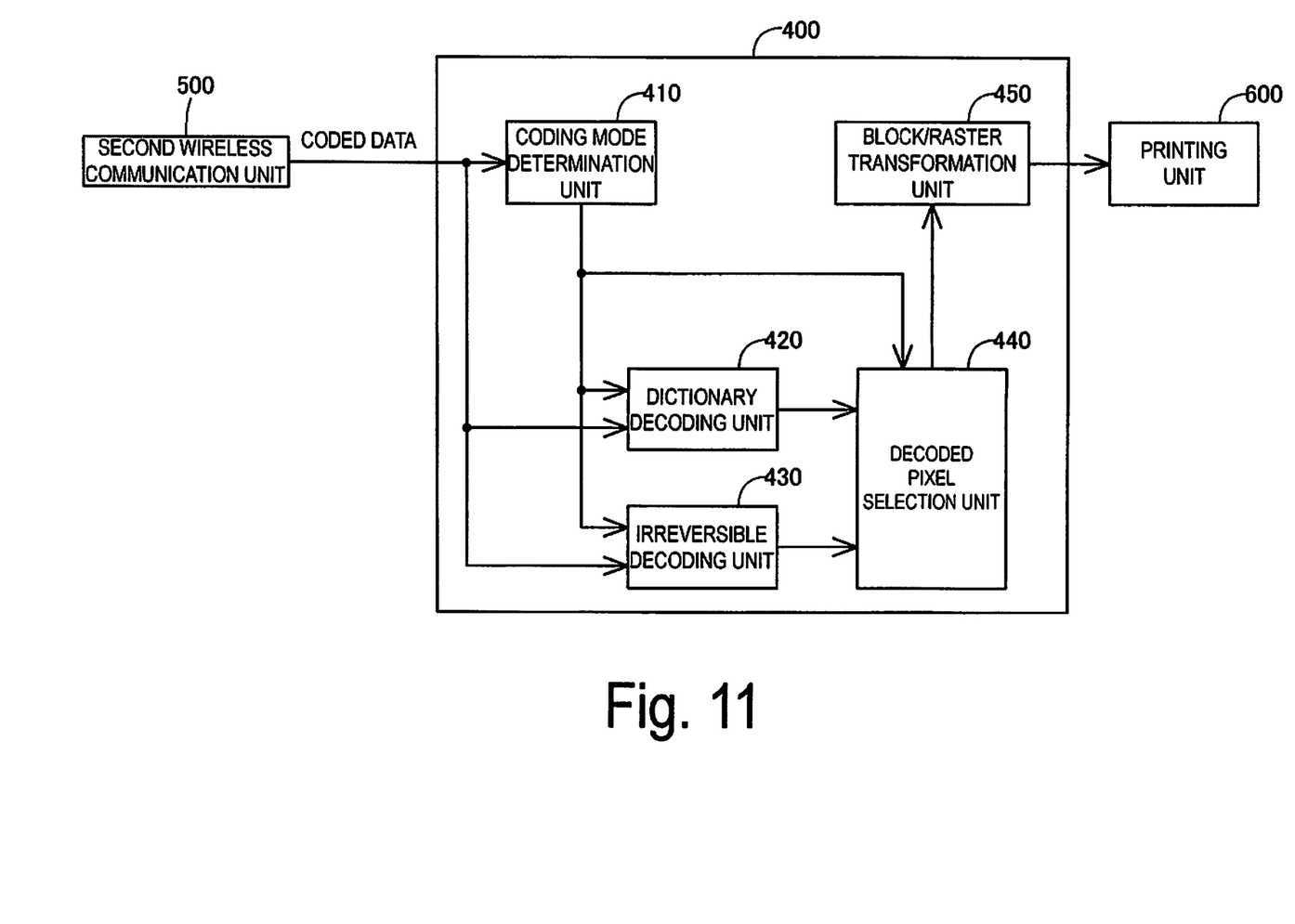
FIG. 11 is a block diagram illustrating an internal configuration of a decoding unit.

Now, the decoding described with reference to FIG. 2 will be described (S400). FIG. 11 is a block diagram illustrating an internal configuration of the decoding unit 400. The decoding unit 400 according to Exemplary Embodiment 1 is configured in hardware. The decoding unit 400 includes a coding mode determination unit 410, a dictionary decoding unit 420, an irreversible decoding unit 430, a decoded pixel selection unit 440, and a block/raster transformation unit 450.

The coding mode determination unit 410 detects, in the coded data, the tag signal serving as coding mode determination bits. The detection allows the coding mode determination unit 410 to determine which one of dictionary coding and irreversible coding has been applied to the subsequent coded data. In a case of determining that the coded data are in the dictionary coding mode, the coding mode determination unit 410 enables the dictionary decoding unit 420 and controls the decoded pixel selection unit 440 to transmit decoded pixel block data in the dictionary decoding unit 420 to the block/raster transformation unit 450.

On the other hand, in a case of determining that the coded data are in the irreversible coding mode, the coding mode determination unit 410 enables the irreversible decoding unit 430 and transmits decoded pixel block data in the irreversible decoding unit 430 to the block/raster transformation unit 450 via the decoded pixel selection unit 440.

The block/raster transformation unit 450 performs a raster transformation on the decoded pixel block data to output the resultant block data to the printing unit 600.

According to Exemplary Embodiment 1 described above, in the dictionary coding mode, the color having most recently appeared is registered in the dictionary. Thus, in a case where consecutive block data include similar color configurations, the number of newly registered colors is few and dictionary coding is likely to be selected. This improves the compression rate for coding. In particular, in a case where the same color appears consecutively, a 1-bit code may be used for consecutive coding. This particularly improves the compression rate.

Moreover, when the coding mode is selected, evaluation for the selection involves colors other than the colors registered in the dictionary, i.e., only the colors for which a code as uncompressed 8-bit data needs to be output. This increases the number of blocks coded in the lossless mode. Thus, quality of decoded images is improved.

Moreover, variable-length coding is performed by moving, to the head of the dictionary indexes (in other words, dictionary index 0), the color having appeared, and assigning shorter codes to more recent dictionary indexes. Then, colors with higher appearance frequencies are coded with shorter codes. This facilitates a reduction in the amount of information in the coded data.

Moreover, the control processing for the reference value N changes the reference value N in accordance with the number of unregistered colors (in other words, the number of newly registered colors). Thus, reversible coding is used for images such as line drawings and texts which include a small number of colors and for which irreversible coding is likely to result in noticeable degradation, and irreversible coding is used for images such as natural images which include a large number of colors and for which reversible coding results in a reduced compression rate. This makes dictionary coding and irreversible coding well balanced. In other words, the compression rate and image quality may be well balanced.

Specifically, in a case where the number of newly registered colors is 1 or greater (S210, NO), the compression rate based on dictionary coding decreases as the number of newly registered colors increases. Thus, the reference value N is preferably changed to make irreversible coding more likely to be selected for the next block data. In Exemplary Embodiment 1, this is achieved by S220. Moreover, in a case where the number of newly registered colors is zero (S210, YES), coding may have been achieved with a high compression rate and high image quality, and thus, dictionary coding preferably continues to be performed. In Exemplary Embodiment 1, this is achieved in S240. However, when block data with many unregistered colors is acquired while the reference value N is excessively large, the compression rate may significantly decrease. Thus, Nmax is specified for the reference value N as an upper limit value.

Figure 12:
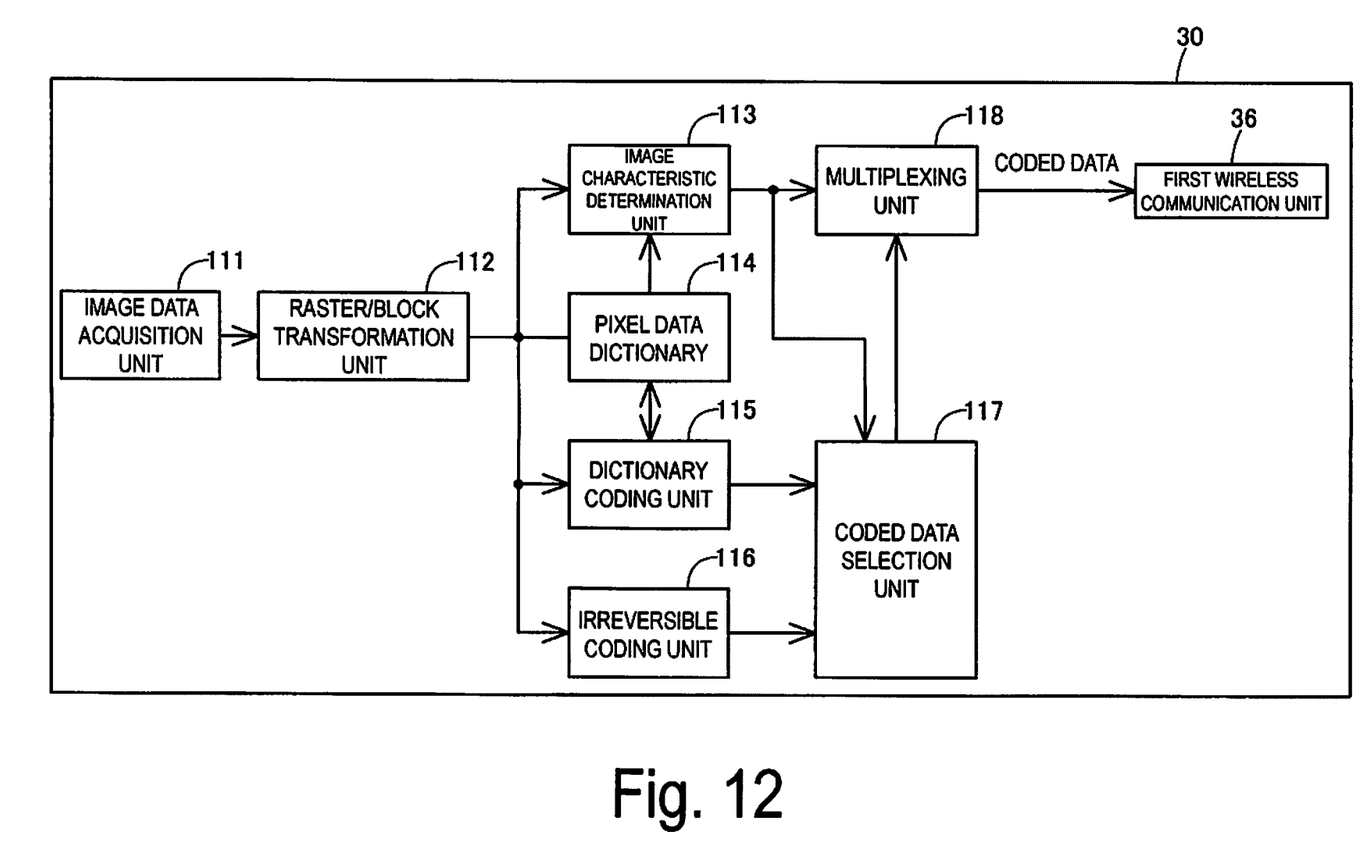
FIG. 12 is a block diagram illustrating a coding unit provided in the image coding device.

Exemplary Embodiment 2 will be described. Description of Exemplary Embodiment 2 is mainly differences compared to Exemplary Embodiment 1. Details not described in Exemplary Embodiment 2 are the same as the corresponding descriptions of Exemplary Embodiment 1. In Exemplary Embodiment 2, coding equivalent to the coding in Exemplary Embodiment 1 is implemented in hardware, instead of a general-purpose computer. FIG. 12 is a block diagram illustrating a coding unit 100 provided in the image coding device 30.

The coding unit 100 includes an image data acquisition unit 111, a raster/block transformation unit 112, an image characteristic determination unit 113, a pixel data dictionary 114, a dictionary coding unit 115, an irreversible coding unit 116, a coded data selection unit 117, and a multiplexing unit 118.

The image data acquisition unit 111 acquires image data to be printed. The raster/block transformation unit 112 generates block data from the received image data. The generated block data are transferred to the image characteristic determination unit 113, the dictionary coding unit 115, and the irreversible coding unit 116.

The image characteristic determination unit 113 receives block data output from the raster/block transformation unit 112 to determine the coding mode. The image characteristic determination unit 113 outputs the determination result as a tag signal. The coding mode means the dictionary coding mode and the irreversible coding mode as described in Exemplary Embodiment 1. The pixel data dictionary 114 is used to determine the coding mode.

Specifically, the image characteristic determination unit 113 counts the number of colors included in the 64 pixels forming the block data. However, color values the same as colors registered in the pixel data dictionary 114 are excluded from the count. In other words, the number of counted colors indicates the number of colors unregistered in the pixel data dictionary 114.

In a case where the count value is less than or equal to the reference value N, the coded data selection unit 117 inputs coded data in the dictionary coding unit 115 to the multiplexing unit 118. In a case where the count value is greater than the reference value N, the coded data selection unit 117 inputs coded data in the irreversible coding unit 116 to the multiplexing unit 118.

Figure 13:
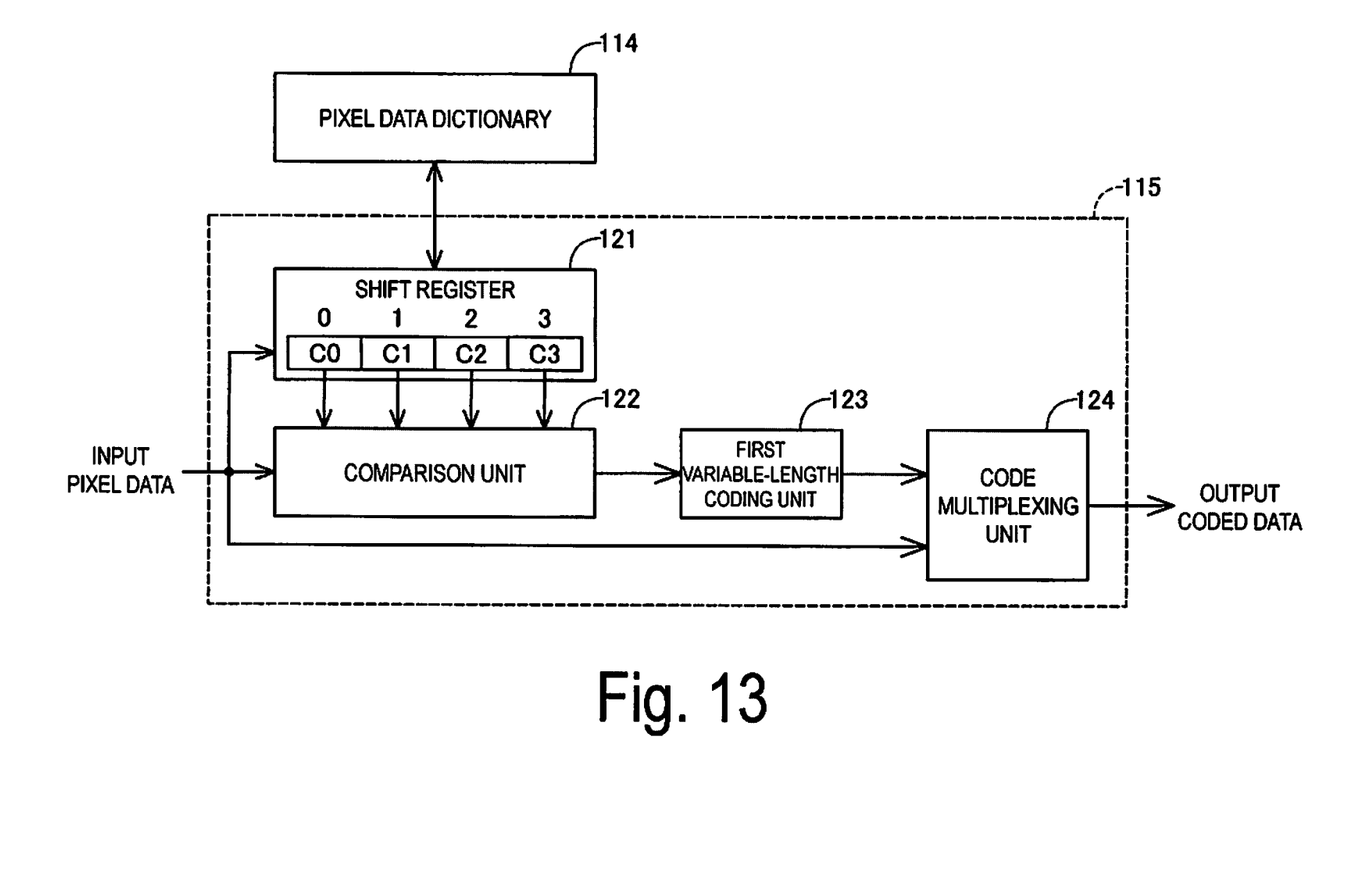
FIG. 13 is a block diagram illustrating a configuration example of a dictionary coding unit.

The dictionary coding unit 115 will be described. FIG. 13 is a block diagram illustrating a configuration example of the dictionary coding unit 115. The dictionary coding unit 115 transforms input pixel data into codes one by one.

First, before coding the first pixel data of the input block image, the dictionary coding unit 115 loads pixel data from the pixel data dictionary 114 into a shift register 121. The shift register 121 includes four stages in which four respective colors are stored. In the illustrated example, colors C0, C1, C2, and C3 are respectively stored in registers 0 to 3. The shift register 121 functions as a dictionary described in Exemplary Embodiment 1.

Subsequently, when receiving one color from the block data, a comparison unit 122 compares the color with each of the colors in the registers 0 to 3. As is the case with the example described with reference to FIG. 5, in a case where the colors match each other, the comparison unit 122 inputs the register number of the matched register to a variable-length coding unit 123 as a dictionary index. Moreover, the comparison unit 122 moves the matched color C2 to the register 0, while respectively moving the colors C0 and C1 stored in the registers 0 and 1 to the registers 1 and 2.

On the other hand, in a case where the color Cx has been received, which is not registered in the registers 0 to 3, the comparison unit 122 inputs an escape code to the variable-length coding unit 123. The escape code in Exemplary Embodiment 2 is designated as 4 to avoid overlapping with the dictionary indexes 0 to 3. Moreover, as is the case with the example described with reference to FIG. 5, the received color Cx is stored in the register 0, while the colors C0, C1, and C2 each stored in the corresponding one of the registers 0, 1, and 2 are respectively moved to the registers 1, 2, and 3.

The variable-length coding unit 123 outputs a variable-length code corresponding to the received dictionary index as illustrated in FIG. 4. In a case of receiving dictionary index 4, the variable-length coding unit 123 outputs the variable-length code of 0001.

In a case where the received color is absent from the dictionary as described above, a code multiplexing unit 124 outputs a reversible code for the color Cx immediately after the escape code to cause the received color to be registered in the dictionary decoding unit 420 of the decoding unit 400. This code packing is performed by the code multiplexing unit 124.

Figure 14:
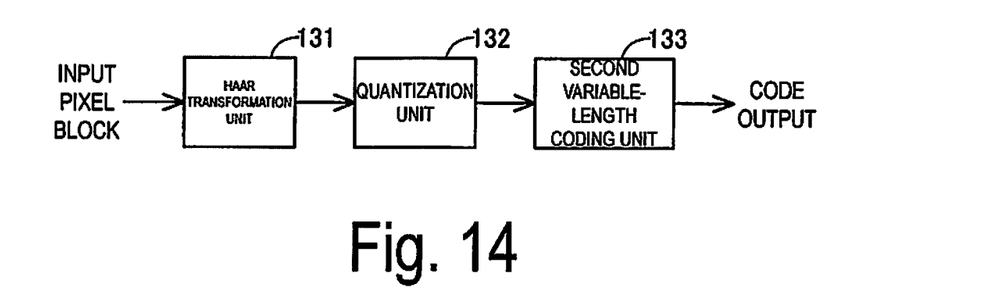
FIG. 14 is a block diagram illustrating a configuration example of an irreversible coding unit 116.

The irreversible coding unit 116 will be described. FIG. 14 is a block diagram illustrating a configuration example of the irreversible coding unit 116. The irreversible coding unit 116 includes a Haar transformation unit 131, a quantization unit 132, and a second variable-length coding unit 133. The Haar transformation unit 131 performs the Haar wavelet transformation described in Exemplary Embodiment 1. The quantization unit 132 performs quantization described in Exemplary Embodiment 1. The second variable-length coding unit 133 transforms each of quantized components into a variable-length code corresponding to the occurrence probability of the component to output the resultant variable-length code.

According to Exemplary Embodiment 2 described above, coding may be implemented in hardware, enabling high-speed coding.

The disclosure is not limited to the exemplary embodiments described herein, but may be implemented in various configurations without departing from the spirits of the disclosure. For example, appropriate replacements or combinations may be made to the technical features in the exemplary embodiments which correspond to the technical features in the aspects described in the Summary section to achieve a part or all of the above-described advantages or to achieve a part or all of the above-described advantageous effects. Any of the technical features may be deleted as appropriate unless the technical feature is described as indispensable. For example, the following exemplary embodiments are illustrated.

The technique for irreversible coding may be a technique using vector quantization or a wavelet transformation, or ADCT. The ADCT refers to adaptive discrete cosine transform and is the initial letters of Adaptive Discrete Cosine Transform.

The image decoding device may not be a printer. For example, the image coding device may be a display device displaying images or video on a screen. Furthermore, wired communication may be used for communication between the image coding device and the image decoding device.

In the exemplary embodiments, coded data are completed and then transmitted. However, as soon as coding of one block data is completed, the coded data may be sequentially transmitted.

The control processing for the reference value N may not be performed. In this case, the reference value N may be a predetermined fixed value.

In the above-described exemplary embodiments, a part or all of the functions and processing implemented by software may be implemented in hardware. Furthermore, a part or all of the functions and processing implemented in hardware may be implemented by software. The hardware may be, for example, any of various circuits such as an integrated circuit, a discrete circuit, or a circuit module with a combination of integrated circuits or discrete circuits.

This application claims priority under 35 U.S.C. § 119 to Japanese Patent Application No. 2018-020685, filed Feb. 8, 2018. The entire disclosure of Japanese Patent Application No. 2018-020685 is hereby incorporated herein by reference.

What is claimed is:

1. An image coding device for coding block data each including a plurality of pixels by selecting, for each block data, one of a lossy mode and a lossless mode in which coding includes use of a dictionary with different colors each registered in a corresponding one of p, dictionary indexes, p being a natural number, the image coding device comprising:
   an irreversible coding unit configured to perform coding in the lossy mode in a case where the number of unregistered colors is greater than a reference value, the number of unregistered colors being the number of colors included in block data of interest and not registered in the dictionary before coding of the block data of interest is started, the block data of interest being included in the block data to be coded and being of interest for coding; and
   a dictionary coding unit configured to perform coding in the lossless mode and register, in the dictionary, q colors most recently coded in the lossless mode in a case where the number of unregistered colors is less than or equal to the reference value, q being a number identical to the p.

2. The image coding device according to claim 1, further comprising:
   an image characteristic determination unit configured to output a signal indicating whether the number of unregistered colors is less than or equal to the reference value.

3. The image coding device according to claim 1, wherein the p is 2 or greater, and
   the dictionary coding unit is configured to register a most recently coded color in a first index, output a code with a first data amount in a case where the color registered in the first index is to be coded, and output a code with a second data amount greater than the first data amount in a case where a color registered in a second index is to be coded.

4. The image coding device according to claim 1, wherein the dictionary coding unit is configured to reversibly code an unregistered color to output a resultant code in a case of coding the unregistered color not registered in the dictionary.

5. The image coding device according to claim 1, wherein the irreversible coding unit is configured to use a Haar wavelet transformation for coding.

6. The image coding device according to claim 1, further comprising:
   a change unit configured to change the reference value in accordance with the number of unregistered colors after the dictionary coding unit performs coding.

7. The image coding device according to claim 1, further comprising:
   a change unit configured to change the reference value in accordance with the number of unregistered colors after the dictionary coding unit performs coding, wherein
   the change unit is configured to reduce the reference value in a case where the number of unregistered colors is greater than a prescribed number, and increase the reference value in a case where the number of unregistered colors is less than or equal to the prescribed number.

8. The image coding device according to claim 1, further comprising:
   a change unit configured to change the reference value in accordance with the number of unregistered colors after the dictionary coding unit performs coding, wherein
   the change unit is configured to reduce the reference value in a case where the number of unregistered colors is greater than a prescribed number, and increase the reference value in a case where the number of unregistered colors is less than or equal to the prescribed number, and
   the change unit is configured to, even in the case where the number of unregistered colors is less than or equal to the prescribed number, maintain the reference value when the reference value is a predetermined upper limit value.

9. The image coding device according to claim 1, further comprising:
   a change unit configured to change the reference value in accordance with the number of unregistered colors after the dictionary coding unit performs coding, wherein
   the change unit is configured to reduce the reference value in a case where the number of unregistered colors is greater than a prescribed number, and increase the reference value in a case where the number of unregistered colors is less than or equal to the prescribed number, and
   the change unit is configured to subtract the number of unregistered colors from the reference value in a current state to reduce the number of unregistered colors.

10. An image coding method for coding block data each including a plurality of pixels by selecting, for each block data, one of a lossy mode and a lossless mode in which coding includes use of a dictionary with different colors each registered in a corresponding one of p dictionary indexes, p being a natural number, the image coding method comprising:
   performing coding in the lossy mode in a case where the number of unregistered colors is greater than a reference value, the number of unregistered colors being the number of colors included in block data of interest and not registered in the dictionary before coding of the block data of interest is started, the block data of interest being included in the block data to be coded and being of interest for coding; and performing coding in the lossless mode and registering, in the dictionary, q colors most recently coded in the lossless mode in a case where the number of unregistered colors is less than or equal to the reference value, q being a number identical to the p.

11. An image coding system comprising:

an image coding device for coding block data each including a plurality of pixels by selecting, for each block data, one of a lossy mode and a lossless mode in which coding includes use of a dictionary with different colors each registered in a corresponding one of p dictionary indexes, p being a natural number, and an image decoding device configured to decode a code created by the image coding device, wherein the image coding device includes:

an irreversible coding unit configured to perform coding in the lossy mode in a case where the number of unregistered colors is greater than a reference value, the number of unregistered colors being the number of colors included in block data of interest and not registered in the dictionary before coding of the block data of interest is started, the block data of interest being included in the block data to be coded and being of interest for coding; and a dictionary coding unit configured to perform coding in the lossless mode and register, in the dictionary, q (q is a number identical to the p) colors most recently coded in the lossless mode in a case where the number of unregistered colors is less than or equal to the reference value.

* * * * *